Dec. 1, 1925.

C. W. BECK 1,563,320

TIRE VALVE

Original Filed May 24, 1922

Inventor
Charles W. Beck.

By Whittemore Hulbert Whittemore
+Belknap  Attorneys

Patented Dec. 1, 1925.

1,563,320

UNITED STATES PATENT OFFICE.

CHARLES W. BECK, OF TOLEDO, OHIO, ASSIGNOR TO THE BECK FROST CORPORATION, OF DETROIT, MICHIGAN, A CORPORATION OF MICHIGAN.

TIRE VALVE.

Original application filed May 24, 1922, Serial No. 563,406. Divided and this application filed February 11, 1924. Serial No. 692,112.

*To all whom it may concern:*

Be it known that I, CHARLES W. BECK, a citizen of the United States of America, residing at Toledo, in the county of Lucas and State of Ohio, have invented certain new and useful Improvements in Tire Valves, of which the following is a specification, reference being had therein to the accompanying drawings.

This invention relates generally to tire valves and refers more particularly to devices for holding washers, gaskets and the like in position upon the movable sleeves of such valves.

An object of the invention is to provide a sleeve of the class referred to that may be formed from either tubing or bar stock and that may be readily provided with spaced stops for holding the washer or gasket in position thereon.

Another object is to provide a strong and durable construction that can be manufactured at a comparatively low cost.

With the above and other objects in view, the invention consists of certain novel features of construction, combination and arrangement of parts as will be more fully described and particularly pointed out in the appended claims.

This application is a divisional of my co-pending application, Serial Number 563,406 filed May 24, 1922, for tire valves.

In the accompanying drawing:—

Figure 1:
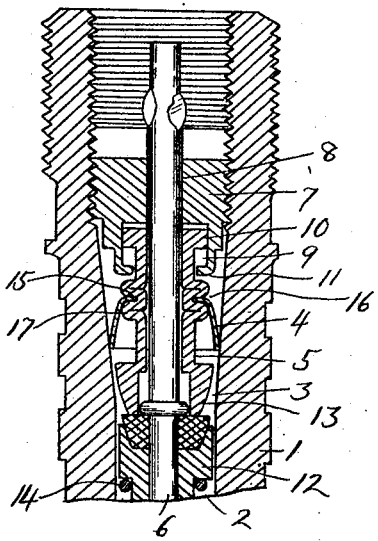
Figure 1 is a longitudinal sectional view through a tire valve embodying my invention.
Figure 2:
Figure 2 is an elevation of a tube after the enlargement has been formed thereon.
Figure 3:
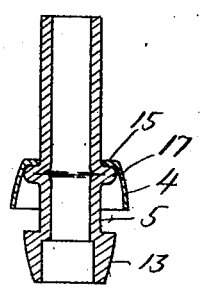
Figure 3 is a vertical sectional view through the sleeve and washer and showing the first step in the formation of the stops.
Figure 4:
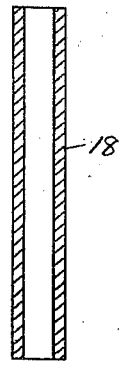
Figures 4, 5 and 6 are views similar to Figures 2 and 3 but showing a slight modification.
Figure 5:
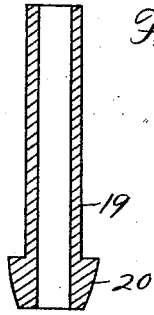
Figure 6:
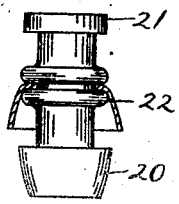

Referring now to the drawing in which like characters of reference designate corresponding parts throughout the several views, the numeral 1 designates a valve casing or shell having a longitudinally extending air passage 2 therethrough. A portion of the passage is restricted as shown at 3 to provide a seat for a dome-shaped washer 4 that is rigidly secured to a sleeve 5 slidably engaging a suitable valve stem 6. Threadedly engaging the casing 1 above the sleeve 5 is a plug 7 having a bore 8 for receiving the stem 6 and having a recess 9 for receiving the upper end of the sleeve 5. The sleeve is provided at its upper end with an annular flange 10 that is adapted to engage an annular flange 11 at the lower end of the recess 9 in the plug. A valve member 12 is located in the passage 2 below the sleeve 5 and is normally held in engagement with an annular enlargement 13 of the lower end of the sleeve by means of a spring 14.

The washer 4 may be constructed of any suitable material such as brass or copper while the sleeve 5 may be machined from solid stock or may be formed from tubing or some suitable material such as brass or copper. When the sleeve is formed from a tube the enlargement 13 and flange 10 are formed by a swaging operation after the washer 4 has been slipped upon the sleeve. To hold the washer in position thereon the tubular sleeve is expanded above and below the flattened portion 15 of the washer as shown at 16. The opposite sides of these expanded portions are then pressed together by suitable dies to form annular beads or stops 17. When the sleeve is formed from bar stock a bar 18 of the desired length is bored and machined to form a tube 19 having the enlargement 20. The washer 4 is then slipped upon the tube, whereupon the flange 21 and stops 22 are formed in the same manner as the flange 10 and stops 17.

While I have shown and described my invention in connection with a tire valve, it is readily apparent that it may be associated with any form of tube upon which it is desired to hold any sort of member by spaced stops. Moreover, it may be found desirable to hold a member within a tube in which case the stops may be formed in precisely the same way except that they will be extended inwardly instead of outwardly as shown in the accompanying drawing.

What I claim as my invention is:—

1. In a valve for pneumatic tires, the combination with a tubular shell having a tapered internal seat portion, a stem extending longitudinally of the shell, a sleeve slidably mounted on the stem having shoulders spaced longitudinally thereof, and a plug surrounding the stem in the shell having means for limiting the sliding movement of the sleeve, of a washer surrounding the sleeve between said shoulders having a flared portion engageable with the tapered portion of the shell to form an air tight seal.

2. In a valve for pneumatic tires, the combination with a tubular shell having a tapered internal seat portion, a stem extending longitudinally of the shell, a sleeve slidably mounted on the stem, and a plug surrounding the stem in the shell having means for limiting the sliding movement of the sleeve, of a cup-shaped washer having the base thereof surrounding the sleeve and having the flared portion thereof engageable with the tapered seat portion of the shell to form an air tight seal.

In testimony whereof I affix my signature.

CHARLES W. BECK.